United States Patent
Payne et al.

(10) Patent No.: US 7,367,488 B2
(45) Date of Patent: May 6, 2008

(54) METHOD OF REPAIR OF THIN WALL HOUSINGS

(75) Inventors: David A. Payne, Phoenix, AZ (US); Paul E. Garland, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/127,658

(22) Filed: May 10, 2005

(65) Prior Publication Data

US 2006/0255100 A1    Nov. 16, 2006

(51) Int. Cl.
*B23K 31/00* (2006.01)
(52) U.S. Cl. ............................ 228/119; 427/140
(58) Field of Classification Search ........... 228/119, 228/164, 173.1, 173.4, 174
See application file for complete search history.

(56) References Cited

U.S. PATENT DOCUMENTS

| | | | |
|---|---|---|---|
| 4,705,203 A | 11/1987 | McComas et al. | |
| 5,295,300 A * | 3/1994 | Garrick, Jr. ............ | 29/888.021 |
| 5,302,414 A | 4/1994 | Alkhimov et al. | |
| 5,471,730 A * | 12/1995 | Sackett .................... | 29/402.12 |
| 5,898,994 A | 5/1999 | Miller et al. | |
| 5,915,743 A | 6/1999 | Palma | |
| 6,258,402 B1 * | 7/2001 | Hussary et al. ............. | 427/142 |
| 6,365,222 B1 * | 4/2002 | Wagner et al. .............. | 427/140 |
| 6,467,272 B1 | 10/2002 | Biondo et al. | |
| 6,491,208 B2 * | 12/2002 | James et al. ................ | 228/119 |
| 6,742,698 B2 | 6/2004 | Shah et al. | |
| 6,827,969 B1 | 12/2004 | Skoog et al. | |
| 6,905,728 B1 * | 6/2005 | Hu et al. .................... | 427/142 |
| 2002/0066770 A1 * | 6/2002 | James et al. ................ | 228/119 |
| 2004/0191064 A1 * | 9/2004 | Guo ........................... | 416/191 |
| 2005/0118330 A1 * | 6/2005 | Clark et al. ................. | 427/140 |
| 2005/0235493 A1 * | 10/2005 | Philip et al. ............... | 29/889.1 |
| 2006/0045785 A1 * | 3/2006 | Hu et al. ...................... | 419/5 |

(Continued)

FOREIGN PATENT DOCUMENTS

EP    0049613 A2    10/1981

(Continued)

OTHER PUBLICATIONS

PCT Int'l Search Report, Aug. 30, 2006.

(Continued)

*Primary Examiner*—Kiley Stoner
(74) *Attorney, Agent, or Firm*—Ingrassia Fisher & Lorenz

(57) ABSTRACT

The present invention provides methods and materials for use in repairing a worn component having thin walls. One kind of thin wall may be the wall of a cylindrical portion of the component where such wall has a worn inner surface and an opposite outer surface. The method includes the steps of preparing the outer surface of the component for cold spraying; cold spraying material onto the outer surface so as to form a strengthening coating; reaming the inner surface so as to create a repair surface with a repair diameter greater than the inner diameter; and installing an insert on the repair surface. The thickness of the coating is selected so as to impart a desired degree of strength to the wall. The method allows the repair of expensive aluminum castings that would otherwise, because of the thin wall construction, not be suitable for repair.

10 Claims, 3 Drawing Sheets

U.S. PATENT DOCUMENTS

| | | | |
|---|---|---|---|
| 2006/0051502 A1* | 3/2006 | Hu et al. | 427/180 |
| 2006/0080832 A1* | 4/2006 | Yip et al. | 29/888.021 |
| 2006/0121183 A1* | 6/2006 | DeBiccari et al. | 427/142 |
| 2006/0134320 A1* | 6/2006 | DeBiccari et al. | 427/140 |
| 2006/0134321 A1* | 6/2006 | DeBiccari et al. | 427/140 |
| 2006/0163323 A1* | 7/2006 | Pietruska et al. | 228/101 |
| 2006/0216428 A1* | 9/2006 | DeBiccari et al. | 427/446 |
| 2006/0219329 A1* | 10/2006 | Hu et al. | 148/527 |
| 2006/0219330 A1* | 10/2006 | Hu et al. | 148/527 |

FOREIGN PATENT DOCUMENTS

| | | |
|---|---|---|
| EP | 0911426 A1 | 4/1999 |
| JP | 59211568 | 11/1984 |
| JP | 62176533 | 8/1987 |

OTHER PUBLICATIONS

Database WPI Week 200253, Derwent Publications Ltd., London, GB; AN 2002-497709, XP002395016 & RU 2 181 083 C2, Apr. 10, 2002.

Database WPI Week 200412. Derwent Publications Ltd., London, GB; AN 2004-110228, XP002395015 & CN 1 456 416 A, Nov. 19, 2003.

* cited by examiner

METHOD OF REPAIR OF THIN WALL HOUSINGS

FIELD OF THE INVENTION

The present invention relates to repairs of components having thin walls, and more particularly relates to the build up of cold spray coatings on surfaces of thin wall components so as to allow further repair to the component.

BACKGROUND OF THE INVENTION

Various components are designed and manufactured to have thin walls. Thin wall technology is increasingly used in components that have application in the transportation industry where it is desired to save weight. Thin wall manufacturing is also used in order to minimize material consumption, and the associated cost, during manufacturing. Thin wall design, described generally, means designing a component with a wall thickness set at or near a minimum needed thickness consistent with the strength requirements for the part. For example, fluid pump housings used in aircraft applications may be complex aluminum castings with thin wall technology. Housing walls in such a component may have a thickness of between about 0.050 to about 0.070 inches. Other structures presently used in aircraft that may have a thin wall design include fuel control housings, lube modules, oil pump housings, and pneumatic valve bodies.

However, the thin wall construction technique is creating difficulties when the time comes to repair the component. After a period of service, a component surface may experience wear or erosion. Fluid pumps, for example, may encounter fluid erosion at surface areas of the component along fluid paths. Mechanical erosion also occurs on those surfaces of a component that experience metal to metal contact. In order to repair surfaces suffering wear, erosion, or scratching, it is generally necessary to machine away a portion of the worn surface. However, if the worn surface is part of a thin wall structure, there is little to no tolerance for machining away material. Machining away material from a worn surface may so weaken the structure that the part could not meet basic strength specifications. However, scrapping the part is often not an attractive alternative. Aluminum castings, such as those described above, can be expensive to replace. Moreover, when a component becomes damaged, it may be that only the wear surface needs to be repaired, while the remainder of the structure is still usable. Thus, it would be desired to find an acceptable repair technique if possible.

Some repair strategies, such as various welding processes, add material to a worn component. Welding, however, is often not well suited to those components having thin wall construction. Welding typically involves heating a component surface to a high temperature sufficient to melt both the surface substrate and an additive material. This high heat can damage the component being repaired. A thin wall structure is particularly subject to warpage during a high heating process such as may be encountered during welding. Moreover, aluminum parts, often found in aviation applications, are also susceptible to heat induced warpage. Thus, it would be desired to identify a repair technique that avoids the potentially negative effects of high heat.

Hence there is an ongoing need to provide improved methods for repairing damaged components with thin walls. It would be desirable to develop repair methods that are simple, inexpensive, and restore the component to a level of performance at least equal to, or preferably, superior to that of the original construction. Finally, it is desired that the repair method allow the assembly to be quickly returned to service. The present invention addresses one or more of these needs.

SUMMARY OF THE INVENTION

The present invention provides methods for use in repair of components with thin walls. In one embodiment, and by way of example only, there is provided a method for repairing a component having a wall with a worn surface and a nonworn surface. The method includes the steps of: cold spraying material onto the nonworn surface of the wall of the component and removing material from the worn surface of the wall of the component. The step of removing material may create a repair surface, and the method may also include the step of adding material, such as an insert, to the repair surface. The method may also include a step of preparing the nonworn surface of the wall of the component so as to receive a cold spraying by an operation such as grinding, degreasing, or grit blasting.

In a further embodiment, still by way of example, there is provided a method for repairing a worn cylinder having a worn inner surface with an inner diameter and an outer surface. The method includes the steps of: preparing the outer surface of the component for cold spraying; cold spraying material onto the outer surface so as to form a coating; reaming the inner surface so as to create a repair surface with a repair diameter greater than the inner diameter; and installing an insert in the repair surface. The insert may be a sleeve with an inner diameter that substantially matches the inner diameter of the worn cylinder.

In still a further embodiment, and again by way of example only, there is provided a repaired component having a thin wall with an outer surface and a machined surface, a cold spray coating deposited on the outer surface of the component, and an added material positioned on the machined surface of the component. The thin wall may define a cylinder, and the added material may be a cylindrical insert with a defined thickness positioned within the cylinder. The cold spray coating may have a thickness at least as great as the cylindrical insert.

Other independent features and advantages of the method for repair of thin wall housings will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

A method is now described for repairing worn components having relatively thin walls that make the component difficult or impossible to repair using known methods. The method includes the general steps of depositing material onto a first surface of a thin wall of the component and then removing material from a second, damaged surface of the thin wall of the component. If necessary, an insert such as a sleeve may be placed so as to bring the second surface back to an original or desired dimension. The step of depositing material on a first side of a wall provides a strengthening and bulking to the component that allows damaged material to be removed from the opposite side of the wall. These steps are thus advantageous in repairing relatively lightweight, thin-walled cylindrical components, such as are found in aviation applications.

Figure 1:
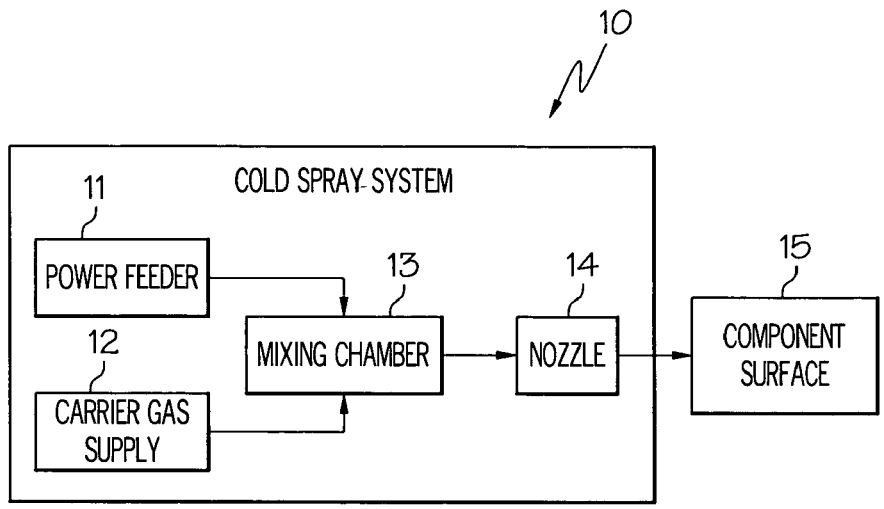
FIG. 1 is a diagrammatic representation of the equipment and apparatus that may be used to perform cold spraying of materials in accordance with an embodiment of the present invention.

In a preferred method, a powder of a coating composition is deposited onto a surface of the damaged component through a cold spraying process. The cold spray process allows the deposition of material without heating the component to a damaging degree. Referring now to FIG. 1 there is shown an exemplary cold spray system 10 illustrated diagrammatically. The system 10 is illustrated as a general scheme, and additional features and components can be implemented into the system 10 as necessary. The main components of the cold spraying system 10 include a powder feeder 11 for providing powder materials, a carrier gas supply 12 (typically including a heater), a mixing chamber 13 and a convergent-divergent nozzle 14. In general, the system 10 mixes the coating particles with a suitable pressurized gas in the mixing chamber 13. The particles are accelerated through the specially designed nozzle 14 and directed toward a component surface 15 at a desired velocity. When the particles strike the component surface 15, converted kinetic energy causes plastic deformation of the particles, which in turn causes the particles to form a bond with the component surface 15. Thus, the cold spray system 10 can bond powder materials to the component surface 15.

The cold spray process may be referred to as a "cold gas" process because the particles are mixed and applied at a temperature that is generally considerably below the melting point of the particles and the substrate material. The kinetic energy of the particles on impact with the component surface 15, rather than particle temperature, causes the particles to plastically deform and bond with the component surface 15. Therefore, bonding to the component surface 15 takes place as a solid state process with insufficient thermal energy to transition the solid powders to molten droplets. Typically, prior to spraying the powder is heated to an average temperature of between approximately 250° F. to approximately 750° F.

A variety of different systems and implementations can be used to perform the cold spraying process. For example, U.S. Pat. No. 5,302,414, entitled "Gas Dynamic Spraying Method for Applying a Coating" and incorporated herein by reference, describes an apparatus designed to accelerate materials having a particle size diameter of between about 5 to about 50 microns, and to mix the particles with a process gas to provide the particles with a density of mass flow between about 0.05 and about 17 g/s-cm$^2$. In other embodiments, a more focused range of mass flow may be about 0.1 to about 1 g/s-cm$^2$. Supersonic velocity is imparted to the gas flow, with the jet formed at high density and low temperature using a predetermined profile. The resulting gas and powder mixture is introduced into the supersonic jet to impart sufficient acceleration to ensure a particle velocity ranging between about 300 and about 1200 m/s. The system typically uses gas pressures of between about 5 to about 20 atm. As non limiting examples, the gases can comprise air, nitrogen, helium and mixtures thereof. Again, this system is but one example of the type of system that can be adapted to cold spray powder materials to the target surface.

The parameters of the cold spraying system are preferably balanced so as to achieve a good bonding between the particles and the component surface, yet without unduly damaging the substrate. The spraying process presents a potentially destructive force in the powder spray directed against the component surface. Additionally, the spraying process can produce a gritting effect on the component surface if the powder spray is directed against the substrate with particle velocities lower than a critical velocity. Thin walled structures may be relatively brittle. Application of inappropriate velocities can stress and crack the component. Thus, to promote plastic deformation the process parameters of process gas and its temperature as well as inlet pressure, particle size, velocity, and particle temperature may be varied to form well bonded cold spray coatings or layers. For aluminum, with helium as the process gas, an exemplary range of parameters is about 5 to about 20 microns for the particle size range and particle velocities of about 500 m/sec to about 1200 m/sec. The parameters may be modified so as to allow the deposition of a coating powder with a particle size range of between about 1 to about 100 microns. Particle size as used herein refers to an average particle size of those particles in the powder. If the process gas is changed the parameters also necessarily change to meet the boundary conditions of cold spray deposit formation. For titanium deposition the parameters are similar, however, higher particle temperatures and higher velocities as compared to aluminum are advantageous to compensate for its inherent reduced plastic deformation behavior.

Figure 2:
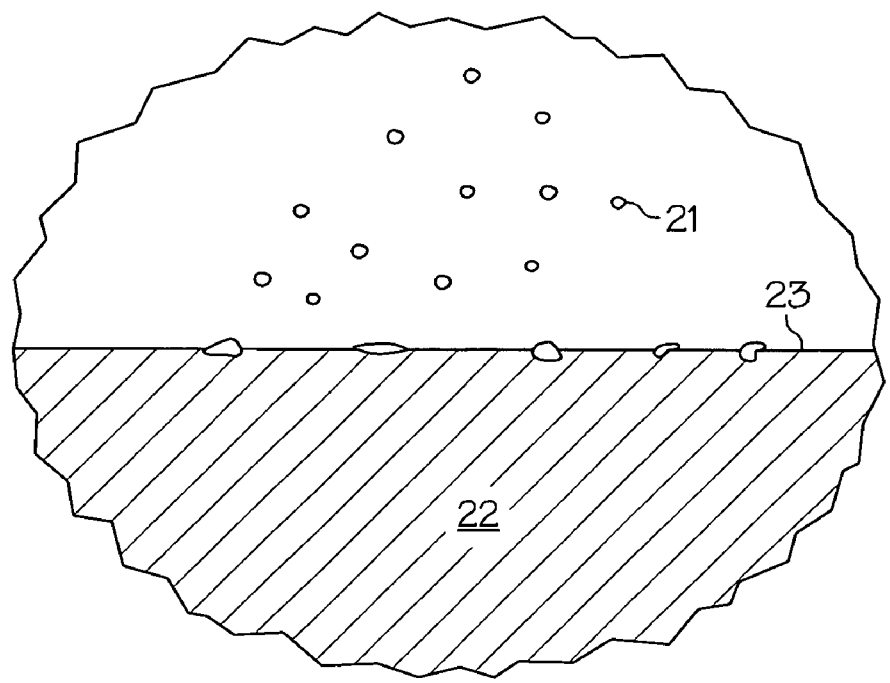
FIG. 2 is an illustration of cold spray particles impinging on a surface of a substrate, according to an embodiment of the present invention.

Referring now to FIG. 2 there is shown a perspective view of coating particles 21 being deposited on a substrate 22. Particles 21 that have impacted the surface 23 of substrate 22 are represented in a deformed, irregular shape, thus indicating the deformation that occurs when the particles contact the substrate. In contrast, the particles 21 that have not yet impacted the substrate, but which are being directed toward the surface of the substrate, are still in a generally original spherical shape. All of the powder particles 21 are generally not perfectly spherical, and FIG. 2 thus represents an approximation of the particle shape. It is further noted in FIG. 2 that particles 21 have not yet covered the entire exposed surface 23 of substrate 22. In a preferred embodiment, deposition continues until particles 21 substantially cover the surface 23 to a desired thickness. A preferred thickness is up to 0.25 inch. The coverage and thickness of the coating provides, in one aspect, a degree of strengthening and reinforcement to the substrate 22. The degree of strengthening can be varied by changing the thickness of the coating as well as the material of the coating.

A cold spraying system may be adapted for use with various materials in both the coating and the substrate. The system may be used with generally any metallic component. With respect to coatings on aluminum, it is preferred to use a powder combining particles of aluminum and aluminum oxide. Titanium, iron, nickel, copper, and alloys thereof may also be used as coatings. Generally, it is preferred that the powder of the coating match the material of the component in order to provide good bonding while minimizing galvanic effects.

Figure 3:
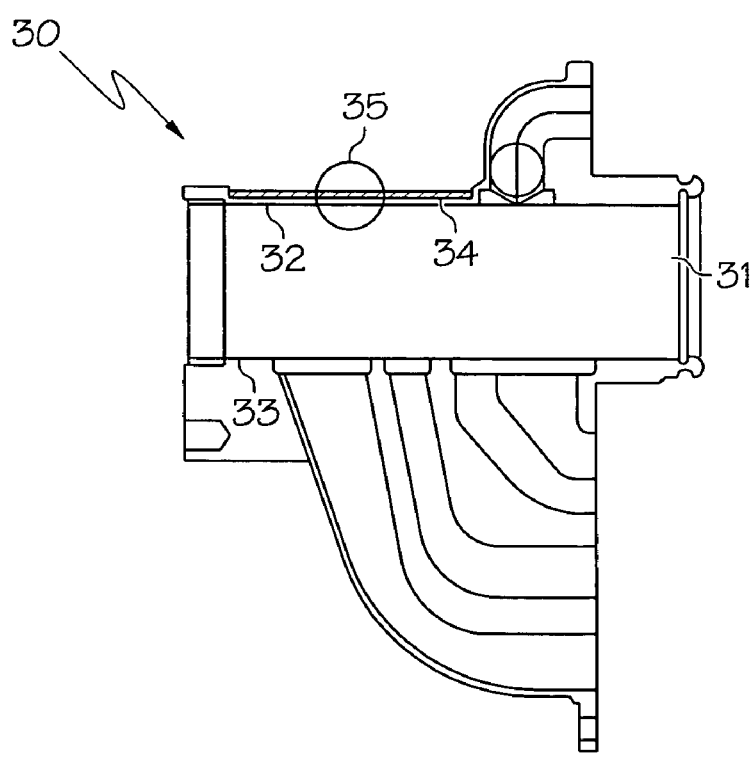
FIG. 3 is a cross sectional view of a pump housing in the process of repair according to an embodiment of the present invention.

Referring now to FIG. 3 there is shown a cross sectional view of a pump housing 30 during repair according to an embodiment of the present invention. Pump housing 30 is exemplary of any number of components that include thin wall sections. A typical such pump housing 30 is a casting of aircraft grade aluminum. The pump housing 30 may include structures such as an inlet, outlet, flanges, and struts, which are illustrated generally but not referenced in the figure. The pump housing 30 also includes cylindrical bore 31. Cylindrical bore 31 is defined by a thin wall 34 having inner surface 32 and outer surface 33. Over a period of operation, pump housing 30 may require repair to thin wall 34. Inner surface 32 may, for example, become worn, scratched, or out-of-round.

One possible repair to pump housing 30 would include reaming inner surface 32 so as to allow the installation of an insert sleeve. The insert provides a new surface that can, if desired, match the original diameter of inner surface 32. Alternatively, the insert may provide an oversized or undersized diameter, compared to the originally manufactured housing 30. However, the dimension of the thin wall 34 may be such that the pump housing 30 cannot withstand a reaming operation. The reaming may remove material that weakens thin wall 34 given the designed thin structure. Further the weakening may not enable thin wall 34 to withstand the stress that accompanies the installation of an insert. Thus, prior to reaming, a strengthening coating 42 is deposited on the outer surface 33, that surface of thin wall 34 on the opposite side of inner surface 32.

Figure 4:
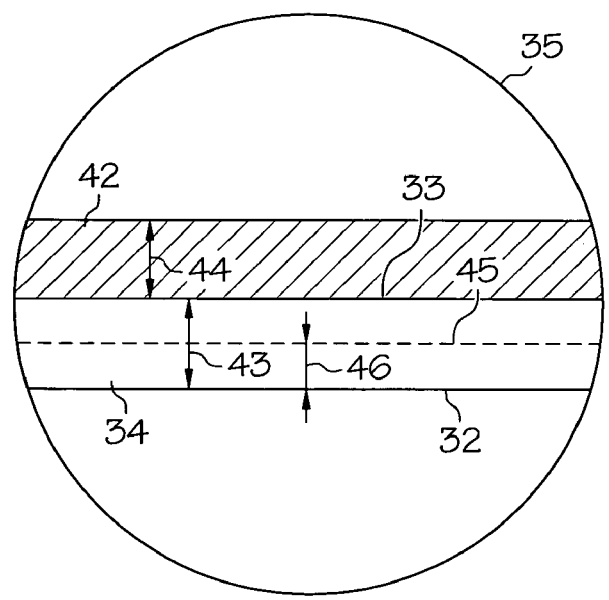
FIG. 4 is a close up cross sectional view showing a region of the pump housing in FIG. 3.

FIG. 4 illustrates the coating aspect from FIG. 3 in magnified perspective. Coating 42 is shown in FIG. 4 as deposited on the outer surface 33 of thin wall 34. Thin wall 34 is characterized by original thickness 43; coating 42 is also characterized by coating thickness 44. In one embodiment, the thickness of coating 42 is generally uniform. During later repair steps material will be removed from inner surface 32. Line 45 represents a machining thickness 46 as an example of how much material is to be removed. While FIG. 4 may not be drawn to scale, coating thickness 44 is preferably at least as thick as the machining thickness 46 though other thicknesses are possible. Additionally, for clarity in illustrating other surfaces, coating 42 may be shown as not covering all areas of outer surface 33 while in practice a full coverage of outer surface 33 may be desired.

The above description has illustrated a preferred embodiment of the repair process as used in making repairs to worn surfaces of cylindrical walls. However, the repair method may be further applied to other component geometries. For example, conduits and tubing that carry fluid may be subject to fluid erosion. Fluid erosion sometimes occurs at locations where a conduit bends or "elbows" as fluid impacts the inner curved surface of the conduit. Fluid pumps, such as illustrated in FIG. 3, may include a casting of a conduit that has an elbow-type geometry. In such a case, the repair may include the deposition of material on the outer surface of the elbow area. This deposition forms a coating on the exterior that builds up strength and material thickness at the region subject to fluid erosion.

Figure 5:
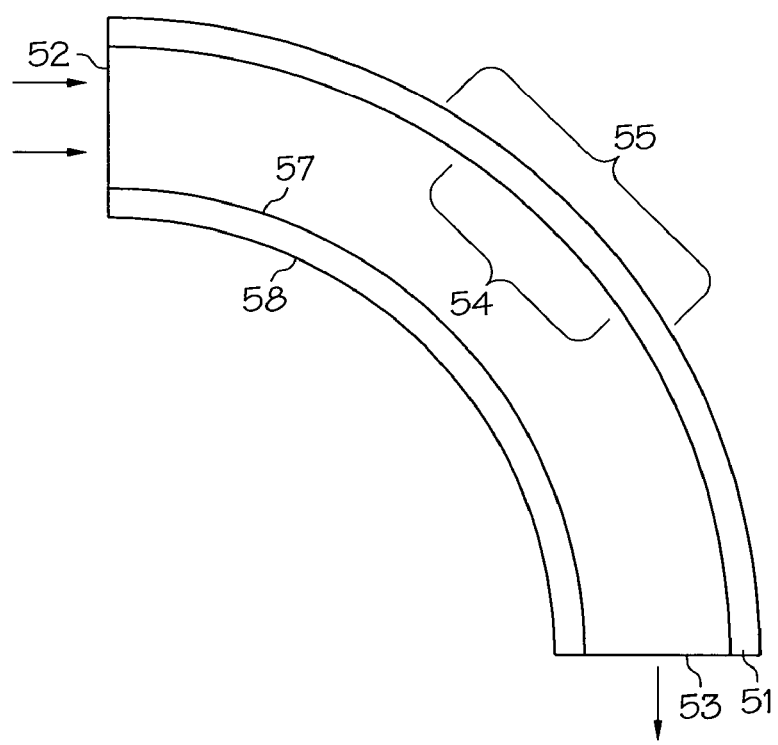
FIG. 5 is a cross sectional view of an elbow joint that may be repaired according to an embodiment of the present invention.

Referring now to FIG. 5 there is shown a cross-sectional view of a fluid conduit 51. Fluid enters conduit 51 at inlet 52 and exits at outlet 53. Conduit 51 includes an interior surface 57 and an exterior surface 58. The conduit 51 is in the shape of an elbow such that the direction of fluid flow, represented by arrows, changes as fluid passes through conduit 51. Thus, conduit 51 is subject to fluid erosion at erosion area 54. To strengthen conduit 51, material is deposited on strengthening area 55. Strengthening area 55 generally corresponds to erosion area 54 in that strengthening area 55 is on that portion of outer surface 58 of conduit 51 that matches the portion on the inner surface 57 of conduit 51 where erosion area 54 is located. However, in a preferred embodiment strengthening area 55 is selected with an area larger than that of erosion area 54. By enlarging strengthening area 55 to be larger than erosion area 54, a safety margin is provided in the repair.

It will be appreciated that the repair method described herein may result in a repaired component with a purposely changed performance rating. For example, the strengthening coating may allow an increase (or other change) in a pressure rating of a fluid line, a fluid pump, or a pressure vessel. The change in pressure rating may arise both due to the strengthening coating and the strength of an insert placed in the component.

Figure 6:
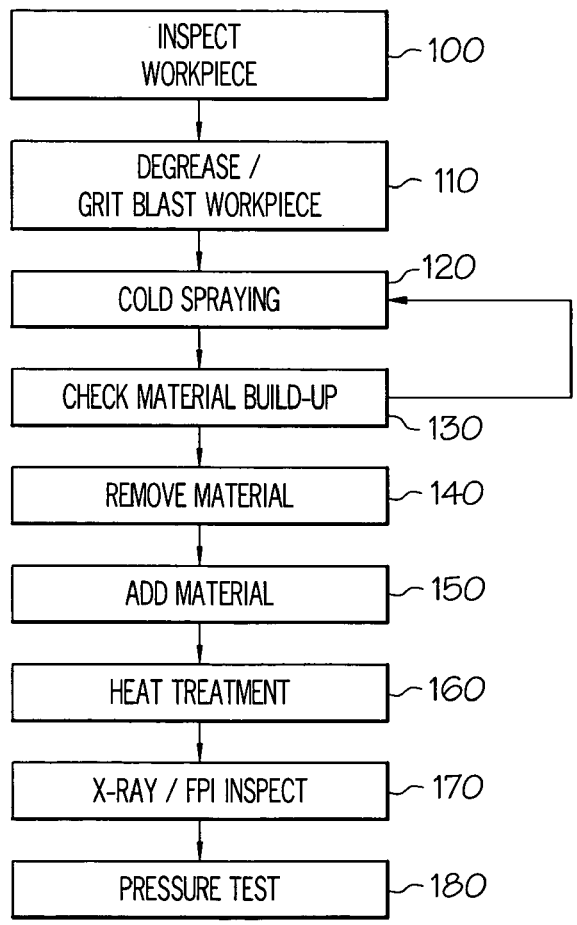
FIG. 6 is a flow chart illustrating steps in a method of making repairs to a damaged component according to an embodiment of the present invention.

Referring now to FIG. 6, one embodiment of the cold spraying repair method is shown in flowchart form. This method includes the cold spray process, and also includes additional optional processes to optimize the resulting repairs. In the method additional optional processing includes a heat treatment to consolidate and homogenize the applied material and to restore metallurgical integrity to the repaired component. Cold spray involves "solid state" processes to effect bonding and coating build-up, and does not rely on the application of external thermal energy for bonding. However, additional processing may be implemented to optimize bonding within the material and many thermomechanical properties for the material such as elastic/plastic properties, mechanical properties, thermal conductivity, and thermal expansion properties.

A suitable workpiece is first identified in step 100. Inspection of the workpiece confirms that the workpiece is a suitable candidate for repair according to embodiments of the present invention. The workpiece should not suffer from mechanical defects or other damage that would disqualify it from service, after receiving the coating treatment.

Step 110 reflects that the workpiece may be subjected to a pre-processing treatment to prepare the piece for receiving a material deposition in further steps. In one embodiment a surface of the component/workpiece receives a pre-treatment machining and/or degreasing in order to remove materials that interfere with cold spraying. The materials to be removed include corrosion, impurity buildups, and contamination on the face of the workpiece. In addition the piece may receive a grit blasting with an abrasive such as aluminum oxide. In a further embodiment the method includes the step of shot or grit blasting the surface of the substrate prior to coating to create a rough surface.

After these preparatory steps, deposition of coating material commences in step 120 through a cold spraying process.

As stated previously, in cold spraying particles at a temperature below their melting temperature are accelerated in a carrier gas to a desired velocity and directed to a target surface on the component. When the particles strike the target surface, the kinetic energy of the particles is converted into plastic deformation of the particle, causing the particle to form a strong bond with the target surface. Particles are typically provided in the cold spray system in a powder of a desired metal or alloy.

The deposition of a coating, layer through cold spraying may occur over several deposition cycles. For example, after a first pass takes place 120, the coating thickness of the first layer is checked 130. If the build-up of material is below a minimum, a second pass occurs 120 on top of the first layer. The thickness of material deposited is then checked again 130. In this manner a series of material deposition steps 120, 130 are repeated, as necessary or desired. Thus a series of spraying passes can build up a desired thickness of newly deposited material. Likewise, a series of spraying passes may be implemented in order to cover a desired surface area with subsequent spraying passes depositing material adjacent to coatings from earlier spraying passes. A series of spraying passes also advantageously provides thorough coverage of the coating over a desired substrate area. Multiple passes further help to provide a coating layer having a generally uniform thickness. As is understood in the art, the deposition of a coating layer may be assisted with automated control of the component being coated or control of the cold spraying nozzle. Visual and digitizing aids may further be used to define and follow spraying paths on the component surface.

In one embodiment, the additional layers deposited over a first layer in a coating may be of a different metal or alloy than the first layer. In this manner coatings are developed so that different laminates or layers of material may have different compositions. In one embodiment, a first layer of aluminum, aluminum alloy, or aluminum composite is deposited, and a second layer of titanium or titanium alloy is deposited over the underlying aluminum layer. The composition of each laminate may be selected so as to provide desired physical and metallurgical characteristics for the coating. For example, an outer titanium layer provides a relatively high degree of toughness, an outer layer of nickel provides a relatively high degree of wear resistance, and a layer of aluminum provides advantageous corrosion and weight characteristics.

In addition to varying the composition of the laminates in a particular coating, a coating may also be tailored to suit the needs of particular areas on the overall component surface. Areas in need of wear resistance may include coatings with nickel; areas needing toughness may include coatings with titanium. Areas without a need for toughness or wear resistance may be coated with aluminum. Thus, a component may be coated with one kind of coating in one area and with a different coating in another area.

In a further step 140, material is removed from the workpiece. This is preferably done by machining a damaged or worn surface of the workpiece. While any degree of material removal may be practiced, it is preferred to remove material so as to create a repair surface to which new material may be added and such that the repair surface allows for good bonding of the added material. Thus, for example, scratches and wear may be machined away to expose a clean metallic surface. Additionally, a cylindrical bore may be reamed to restore the bore to a circular dimension that can receive a sleeve insert.

In a subsequent step 150, material is added to the repair surface. Any kind of material addition may be practiced as an added material. Metallic sleeves, as mentioned, may be inserted. Inserts, patches, shims, and fillers may be used. Nonmetallic filler, such as epoxy and binders, may also be added material. While it is preferred that steps 140 and 150 follow the cold spraying steps in 120 and 130 other step arrangements may be practiced.

Next, an optional heat treatment 160 may be performed on the coated component. The heat treatment may vary depending on the materials used in the component and the coating. An exemplary heat treatment for aluminum deposited on an aluminum substrate includes a homogenizing treatment in the range of about 600° F. to about 725° F. for about 0.5 hours to about 2 hours in duration. The lower time limits in this heat treatment example are generally preferred when the higher temperatures are employed in the homogenization. Other temperature and time ranges may be used to provide a heat treatment.

An FPI (Fluorescent Penetration Inspection) procedure, as well as an x-ray inspection 170, may follow on the refurbished component. Additionally, in workpieces that are designed to withstand pressures, such as pump housings and pressure vessels, a pressure test 180 may be performed. The order of steps 170 and 180 may be varied. At this time the component may be returned to service, or placed in service for the first time.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for repairing a component having a wall with a worn interior surface and an opposite nonworn exterior surface, the method comprising the steps of:

cold spraying a coating powder onto the nonworn exterior surface of the wall of the component, wherein the cold spraying is performed as a solid state process at a temperature that is below the melting point of the coating powder; and removing material from the worn interior surface that is opposite the coated nonworn exterior surface, after performing the cold spraying step.

2. A method for repairing a worn cylinder having non-worn outer surface and an opposite worn inner surface with an inner diameter, the method comprising the steps of:

preparing the non-worn outer surface of the cylinder for cold spraying;

cold spraying a coating powder onto the non-worn outer surface so as to form a coating, wherein the cold spraying is performed as a solid state process at a temperature that is below the melting point of the coating powder;

reaming the worn inner surface that is opposite the coated nonworn outer surface after performing the cold spraying step so as to create a repair surface with a repair diameter greater than the inner diameter; and installing an insert on the repair surface.

3. The method according to claim 2 wherein the insert comprises a sleeve with an inner diameter that substantially matches the inner diameter of the worn cylinder.

4. The method according to claim 2 wherein the cold spraying further comprises accelerating particles of a coating powder to a velocity between about 500 to about 1200 meters/second.

5. The method according to claim 2 wherein the reaming removes material having a machining thickness, and wherein the coating has a thickness at least as great as the machining thickness.

6. The method according to claim 2 wherein the cylinder comprises a cylinder material, and wherein the coating powder comprises a material that matches the cylinder material.

7. The method according to claim 2 wherein the coating powder comprises aluminum and aluminum oxide.

8. The method according to claim 2 wherein the step of cold spraying comprises cold spraying a first powder material onto the outer surface of the component so as to form a first coating layer, checking material build-up of the first coating layer, and cold spraying a second powder material onto the first coating layer so as to form a second coating layer.

9. The method according to claim 2 wherein the step of cold spraying produces a coated component, and further comprising heat treating the coated component at approximately 600° F. to approximately 725° F. for approximately 0.5 to approximately 2 hours.

10. The method according to claim 2 further comprising inspecting the component by x-ray inspection or FPI inspection.

* * * * *